(12) United States Patent
Hoffer et al.

(10) Patent No.: US 8,573,098 B2
(45) Date of Patent: Nov. 5, 2013

(54) CUTTING TOOL INCLUDING A LOCKING SCREW AND ADAPTER WITH COOLANT DELIVERY

(75) Inventors: Brad D Hoffer, White, PA (US); Ruy Frota De Souza Filho, Latrobe, PA (US); Thomas J Long, II, Greensburg, PA (US); Kevin M Gamble, Stahlstown, PA (US); James M Waggle, Derry, PA (US)

(73) Assignee: Kennametal Inc., Latrobe, PA (US)

( * ) Notice: Subject to any disclaimer, the term of this patent is extended or adjusted under 35 U.S.C. 154(b) by 452 days.

(21) Appl. No.: 13/041,641

(22) Filed: Mar. 7, 2011

(65) Prior Publication Data

US 2012/0230781 A1   Sep. 13, 2012

(51) Int. Cl.
*B23C 5/28* (2006.01)
*B23C 5/16* (2006.01)

(52) U.S. Cl.
USPC .................................................. 82/50; 407/11

(58) Field of Classification Search
USPC ................... 407/11; 82/50; 409/136; 408/59; 279/20
See application file for complete search history.

(56) References Cited

U.S. PATENT DOCUMENTS

| | | | |
|---|---|---|---|
| 5,237,894 A | 8/1993 | Lindeke | |
| 5,275,633 A | 1/1994 | Johansson et al. | |
| 5,439,327 A | 8/1995 | Wertheim | |
| 6,045,300 A | 4/2000 | Antoun | |
| 6,299,388 B1 | 10/2001 | Slabe | |
| 6,652,200 B2 | 11/2003 | Kraemer | |
| 7,125,207 B2 | 10/2006 | Craig et al. | |

FOREIGN PATENT DOCUMENTS

DE   30 04 166 C2   7/1988
FR   2 244 590      4/1975

*Primary Examiner* — Will Fridie, Jr.
(74) *Attorney, Agent, or Firm* — Larry R. Meenan, Esq.

(57) ABSTRACT

A cutting tool has a cutter body, which carries a cutting insert, and an adapter, which has a longitudinal adapter axis, wherein a locking screw attaches the cutter body to the adapter. A coolant volume is defined in a vicinity of a meeting of the cutter body, the adapter and the locking screw. The adapter contains an axial adapter bore. The locking screw contains a transverse locking screw bore in fluid communication with the axial adapter bore. The locking screw further contains a peripheral transverse locking screw bore passage in fluid communication with the coolant volume and the transverse locking screw bore. The coolant volume and the transverse locking screw bore are in fluid communication with the cutter body coolant passage.

18 Claims, 7 Drawing Sheets

CUTTING TOOL INCLUDING A LOCKING SCREW AND ADAPTER WITH COOLANT DELIVERY

BACKGROUND OF THE INVENTION

The present invention relates to machine tools, and more particularly, to a cutting tool that includes a cutter body along with a locking screw and an adapter. More specifically, the invention relates to the locking screw alone, as well as the combination of the locking screw with other components(s), that provide improved coolant delivery to the cutter body. Further, the invention relates to an improved locking screw, as well as the combination of the locking screw with other components(s), that provide an improvement to the design flexibility of the cutter body.

In a conventional cutting arrangement, a cutter body retains or holds one or more cutting inserts. The cutter body operatively attaches to a machine such as, for example, a milling machine. An adapter is useful for the attachment of the cutter body to the milling machine wherein the locking screw secures the cutter body to the adapter. Typically, the milling machine drives the cutter body so as to rotate the cutter body. Upon rotation, the cutting inserts engage the workpiece material thereby removing material from the workpiece. It is typical that heat is generated at the interface between the cutting insert and the workpiece material.

Heat generated due to the material removal process can be detrimental to the integrity of the cutting insert. For example, a cutting insert made from cemented tungsten carbide maintains its integrity up to a certain temperature. If the heat generated and passed along to the cutting insert causes the temperature to rise above a certain limit, the cutting insert can be susceptible to plastic deformation. Plastic deformation is detrimental to the cutting insert in that it can result in the failure of the cutting insert. Heretofore, one way to help alleviate heat-related cutting insert failure has been to supply coolant to the cutting insert or to the vicinity of the cutting insert-workpiece interface.

The following patent documents are exemplary of ways to supply coolant to the cutting insert or to the vicinity of the cutting insert-workpiece interface: U.S. Pat. No. 5,237,894 to Lindeke; U.S. Pat. No. 5,275,633 to Johansson et al.; U.S. Pat. No. 5,439,327 to Wertheim; U.S. Pat. No. 6,045,300 to Antoun; U.S. Pat. No. 6,299,388 to Slabe; U.S. Pat. No. 6,652,200 to Kramer; U.S. Pat. No. 7,125,207 to Craig et al.; German Patent 30 04 166 to Sandvik A B; and French Patent 2 244 590 to Georges.

Even though arrangements exist that provide delivery of coolant, there remains a need to improve the way the assembly supplies coolant to the cutting insert and/or to the vicinity of the cutting insert-workpiece interface. This is the case when it comes to the volume (or size) of the supply of coolant available for delivery to the cutting insert and/or to the vicinity of the cutting insert-workpiece interface. There would be a benefit to provide an assembly through which there is an increase in the supply of coolant for delivery to the cutting insert and/or to the vicinity of the cutting insert-workpiece interface. This benefit would comprise either supplying a greater volume of coolant to the cutting insert and/or to the vicinity of the cutting insert-workpiece interface or increasing the number of cutting insert seats and cutting inserts on the assembly.

It would therefore be highly desirable to provide a locking screw, which is a component of the entire assembly, to facilitate an increase in the volume of coolant available for delivery to the cutting insert and/or the vicinity of the cutting insert-workpiece interface over what has been available heretofore. It would also be highly desirable to provide a locking screw in combination with other components(s) to facilitate an increase in the volume of coolant available for delivery to the cutting insert and/or the vicinity of the cutting insert-workpiece interface over what has been available heretofore.

In some typical cutting tools, the basic components comprise a cutter body (which carries the cutting inserts), an adapter and a locking screw. The cutter body contains a pilot hole which receives a pilot projecting from the adapter. The locking screw secures the cutter body to the adapter. Coolant travels from the coolant source into the adapter and then into and through the locking screw. Coolant exits the locking screw through the outlet of a transverse bore into a coolant passage in the cutter body and discharges toward the cutting insert. Heretofore, the coolant passage in the cutter body had to be in fluid communication with the outlet of the transverse bore of the locking screw. Thus, the entrance to the coolant passage has been restricted to a location above (axially forward) the location where the locking screw seats on the cutter body. Such a design restriction has limited the design of the cutter body. It would be highly desirable to provide a locking screw, as well as a combination of the locking screw with other component(s), that expands the locations for the entrance to the coolant passage in the cutter body.

One such location for the entrance to the coolant passage would be below (axially rearward) the location where the locking screw seats on the cutter body. Thus, it would be highly desirable to provide a locking screw, as well as a combination of the locking screw with other component(s), that expands the location for the entrance to the coolant passage in the cutter body to be below (axially rearward) of the location where the locking screw seats on the cutter body.

SUMMARY OF THE INVENTION

In one form thereof, the invention is a cutting tool in fluid communication with a coolant source. The cutting tool comprises a cutter body adapted to carry a cutting insert and containing a cutter body coolant passage. The cutting tool further includes an adapter, which contains a first adapter bore in fluid communication with the coolant source. The cutting tool also includes a locking screw wherein the locking screw engages the adapter so as to secure the cutter body to the adapter. There is a coolant volume in a vicinity of a meeting of the cutter body, the adapter and the locking screw. The locking screw contains a locking screw bore in fluid communication with the first adapter bore and a peripheral locking screw bore passage in fluid communication with the coolant volume and the locking screw bore. The locking screw bore is in fluid communication with the cutter body coolant passage. The coolant volume is in fluid communication with the cutter body coolant passage.

In another form thereof, the invention is an adapter for attachment to a cutter body by a locking screw wherein the adapter is in fluid communication with a coolant source. The adapter comprises an adapter body, which has a central longitudinal adapter axis, and contains an axial adapter bore generally co-axial with the central longitudinal adapter axis. The axial adapter bore is in fluid communication with the coolant source. The adapter contains a peripheral adapter bore offset radially from the central longitudinal adapter axis. The axial adapter bore is in fluid communication with the peripheral adapter bore.

In yet another form, the invention is a locking screw for use in the attachment of a cutter body to an adapter wherein the adapter is in fluid communication with a coolant source via an axial adapter bore. There is a coolant volume defined in a vicinity of a meeting of the cutter body, the adapter and the locking screw. The locking screw comprises a locking screw body that contains a transverse locking screw bore in fluid communication with the axial adapter bore. The transverse locking screw bore has a peripheral transverse locking screw bore passage wherein the peripheral transverse locking screw bore passage is in fluid communication with the coolant volume.

BRIEF DESCRIPTION OF THE DRAWINGS

The following is a brief description of the drawings that form a part of this patent application.

DETAILED DESCRIPTION

Figure 1:
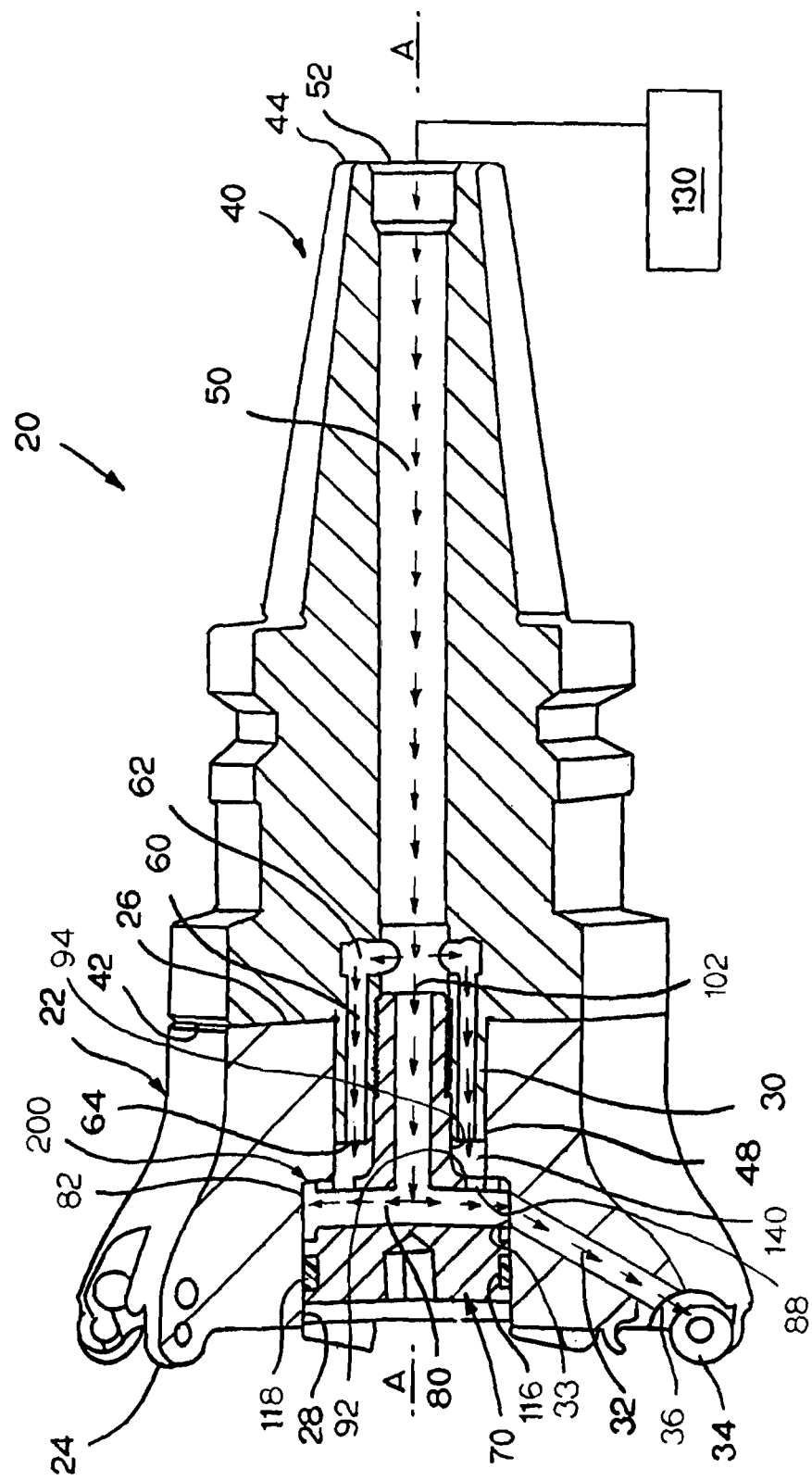
FIG. 1 is a side view of one specific embodiment of the cutting tool showing the assembly of the cutter body, the adapter and the locking screw wherein a portion of the assembly is removed to expose the interior structure of the assembly wherein the entrance to the coolant passage in the cutter body is above (axially forward of) the location where the locking screw seats on the cutter body.

Referring to the drawings, FIG. 1 is a side view of one specific embodiment a cutting tool generally designated as 20. The cutting tool 20 comprises an assembly of the cutter body generally designated as 22, the adapter generally designated as 40 and the locking screw generally designated as 70. The cutter body 22 is at the axial forward end of the cutting tool 20 and the adapter 40 is at the axial rearward end of the cutting tool 20. The cutter body 22 has an axial forward end 24 and an axial rearward end 26. The cutter body 22 further contains a central aperture 28 and a pilot hole 30.

The cutter body further contains at least one cutter body coolant passage 32. Each one of the cutter body coolant passages 32 exits toward a cutting insert seat 34 wherein coolant discharges or sprays from a discharge opening 36 toward the cutting insert and/or the vicinity of the cutting insert-workpiece interface. Coolant enters the coolant passage 32 through an entrance 33. Typically, at least one cutter body coolant passage 32 supplies coolant to a cutting insert in one cutting insert seat 34. The cutting insert seat 34 can take on any one of a number configurations depending upon the specific geometry of the cutter body 22, as well as the geometry of the cutting insert to be carried in the seat.

The cutting insert seat 34 retains a cutting insert (not illustrated) therein. The cutter body 22 typically carries a plurality of cutting inserts. In operation, the cutter tool rotates about its central longitudinal tool axis A-A. When rotating, the cutting inserts engage a workpiece at an interface between each cutting insert and the workpiece to remove workpiece material. Heat is generated at (and in the vicinity of) the interface between the cutting insert and the workpiece. Although there will be a description hereinafter, the orientation of the cutting insert in the cutting insert seat 34 is such that coolant exiting (or discharging) from the discharge opening 36 of the cutter body coolant passage 32 impinges the cutting insert and/or in the vicinity of the interface between the cutting insert and the workpiece material. The present invention allows for an increase in the supply of coolant available for delivery to (or impingement on) the cutting insert and/or the vicinity of the cutting insert-workpiece interface over what has been available heretofore. The impingement of the coolant helps maintain the temperature of the cutting insert at an acceptable level during operation. Many operational advantages exist due to the maintenance of the cutting insert at such an acceptable temperature.

Figure 2:
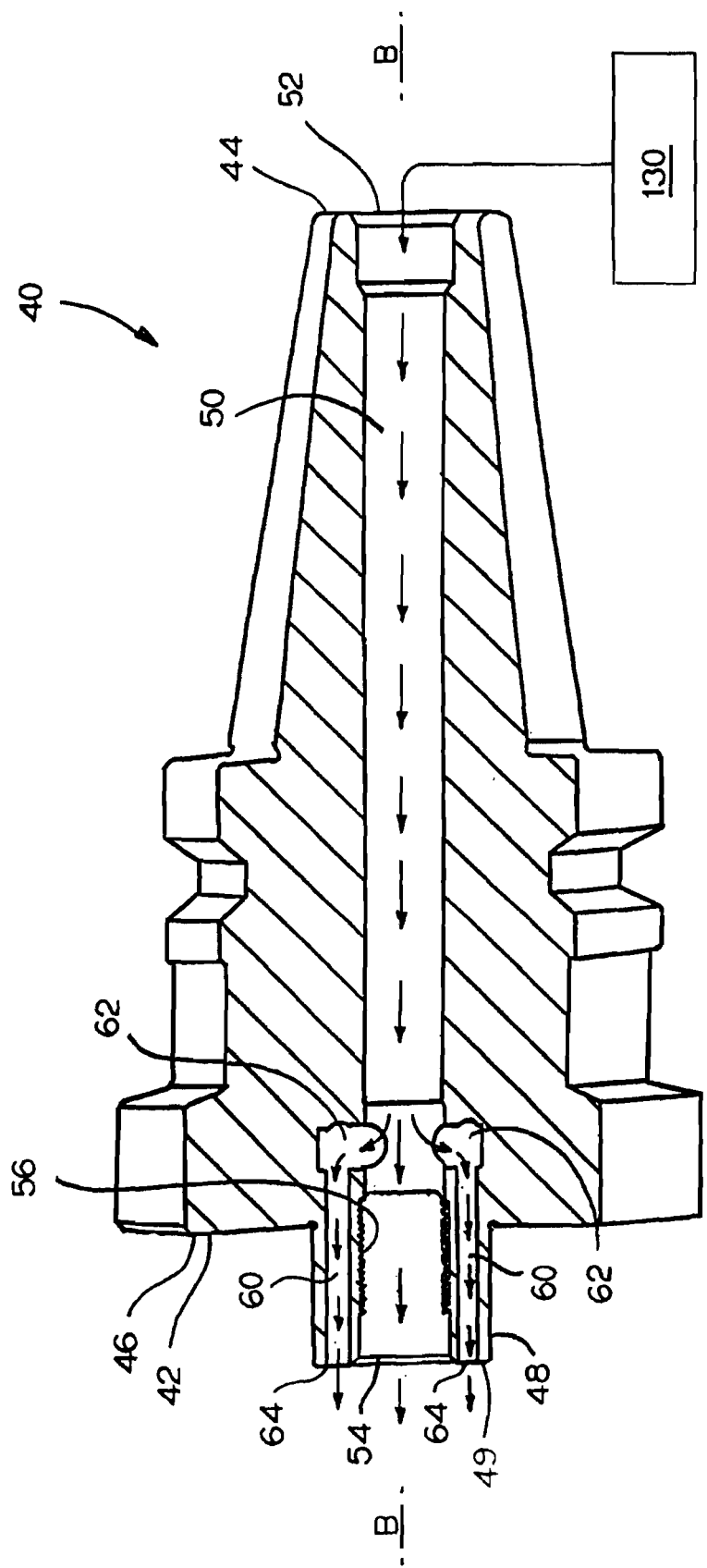
FIG. 2 is a side view of the adapter of FIG. 1 with a portion removed to illustrate the interior structure of the adapter and show by arrows the flow of coolant in the adapter.

Referring to FIGS. 1 and 2, the adapter 40 is axial rearward of the cutter body 22. The adapter 40 has an axial forward end 42 and an axial rearward end 44. The adapter 40 further has a pilot 48 at the axial forward end 42. The pilot 48 projects in an axial forward direction from the axial forward end 42 of the adapter 40 whereby a flange 46 surrounds the pilot 48. The pilot 48 has a distal end surface 49. The adapter 40 contains a central axial adapter bore 50, which has a central axial adapter bore inlet 52 and a central axial adapter bore outlet 54. The adapter 40 has a central longitudinal adapter axis B-B, which is generally co-axial with the central longitudinal tool axis A-A of the cutting tool 20. The central axial adapter bore 50 further contains an interior threaded region 56, which has interior threads, adjacent the central axial adapter bore outlet 54. As will be described hereinafter, the interior threaded region 56 engages an exterior threaded region 110 on the locking screw 70 to securely attach the cutter body 22 to the adapter 40.

The adapter 40 further contains a plurality of peripheral adapter bores 60. In the specific embodiment of FIGS. 1 and 2, there are four peripheral adapter bores 60. Although there are four peripheral adapter bores 60 in the specific embodiment, this should not be considered as a restriction on the scope of the invention. Each peripheral adapter bore 60 is offset radially from the central longitudinal adapter axis B-B. Each peripheral adapter bore 60 has a peripheral adapter bore inlet 62 and a peripheral adapter bore outlet 64. Each peripheral adapter bore 60 has an orientation to be generally parallel to the central longitudinal adapter axis B-B of the central axial adapter bore 50.

The peripheral adapter bore inlet 62 provides fluid communication between the peripheral adapter bore 60 and the central axial adapter bore 50 whereby a certain volume of the coolant traveling in the central axial adapter bore 50 passes into the peripheral adapter bore 60 through the peripheral adapter bore inlet 62. This volume of the coolant then travels through the peripheral adapter bore 60 exiting at the peripheral adapter bore outlet 64. As will be apparent from the description hereinafter, the balance of the coolant traveling in the central axial adapter bore 50, which does not exit into the peripheral adapter bores 60, exits directly into the central longitudinal locking screw bore 100 defined by the locking screw 70.

In reference to the division of the coolant flow between the central axial adapter bore 50 and the peripheral adapter bore 60, between about 60 volume percent and between about 80 volume percent of the coolant entering the central axial adapter bore inlet 52 flows through an entire length of the central axial adapter bore 50, and between about 20 volume percent and about 40 volume percent of the coolant entering the central axial adapter bore inlet 52 flows into the peripheral adapter bore 60. In another range, between about 65 volume percent and between about 75 volume percent of the coolant entering the central axial adapter bore 50 inlet flows through an entire length of the central axial adapter bore 50, and between about 25 volume percent and about 35 volume percent of the coolant entering the central axial adapter bore inlet 52 flows into the peripheral adapter bore 60.

Figure 3:
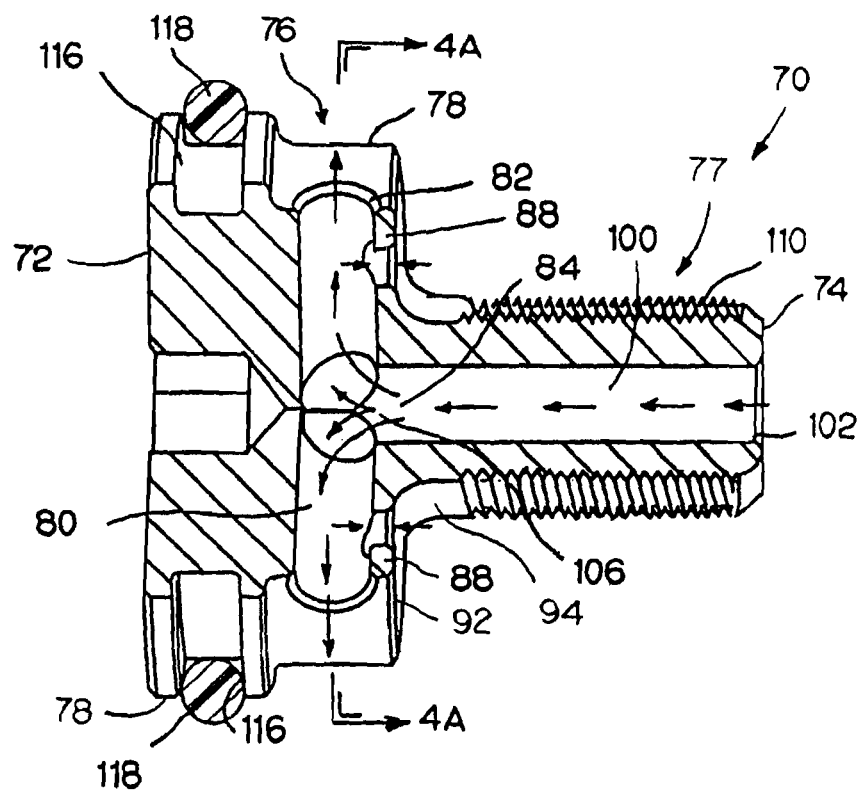
FIG. 3 is a side view of the specific embodiment of the locking screw of FIG. 1 with a portion removed to illustrate the interior structure of the locking screw and show by arrows the flow of coolant in the locking screw.
Figure 4:
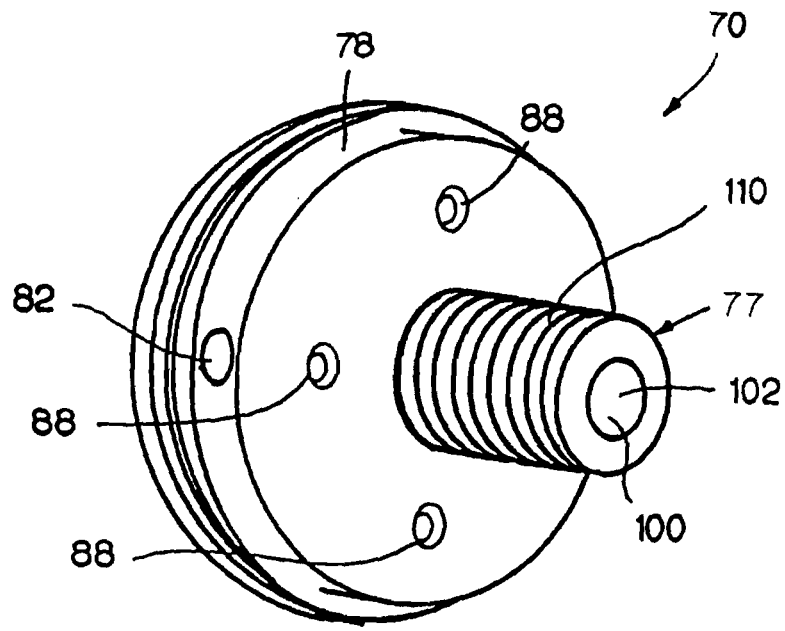
FIG. 4 is an isometric view of the locking screw of FIG. 3.
Figure 4A:
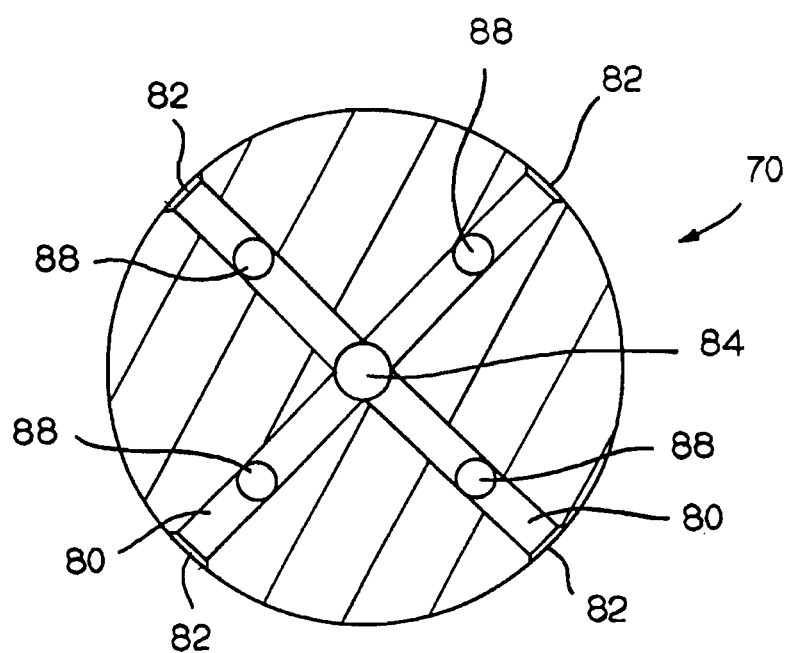
FIG. 4A is a cross-sectional view of the locking screw of FIG. 3 taken along section line 4A-4A in FIG. 3.

FIGS. 3, 4 and 4A illustrate one specific embodiment of the locking screw 70. Locking screw 70 has an axial forward end 72 and an axial rearward end 74. The locking screw 70 has a head portion generally designated as 76 adjacent to the axial forward end 72. The locking screw 70 has a shank portion generally designated as 77 adjacent the axial rearward end 74. The head portion 76 has a diameter (or transverse dimension) greater than the diameter (or transverse dimension) of the shank portion 77.

The head portion 76 has a peripheral edge surface 78. The peripheral edge surface 78 has a seal groove 116, which carries a resilient locking screw seal 118. One typical material for the locking screw seal 118 is a elastomeric material. When the locking screw 70 is used to attach the cutter body 22 to the adapter 40, the resilient seal 118 creates a fluid-tight seal between the locking screw 70 and the surface of the cutter body 22 that defines the central aperture 28 of the cutter body 22.

Referring to FIG. 1, there is a coolant volume 140 defined in a vicinity of the meeting of the cutter body 22, the adapter 40, and the locking screw 70. More specifically, the coolant volume 140 is defined between a portion of surface of the central aperture 28 of the cutter body 22, the distal end surface 49 of the pilot 48, and a portion of the axially rearward facing surface 92 of the head portion 76 and a portion of the exterior surface 94 of the shank 77 of the locking screw 70.

As illustrated in FIG. 4A, the head portion 76 of the locking screw 70 contains a pair of intersecting transverse locking screw bores 80. Each one of the transverse locking screw bores 80 has at its distal end a transverse locking screw bore outlet 82. Each one of the transverse locking screw bores 80 has a central transverse locking screw bore inlet 84. The central transverse locking screw bore inlet 84 is in general alignment with the central longitudinal axis A-A of the cutting tool 20 and the central longitudinal adapter axis B-B of the adapter 40. As one can appreciate, some of the coolant traveling in the central axial adapter bore 50, i.e., the coolant that flows through the entire length of the central longitudinal axial adapter bore 50, enters into the transverse locking screw bores 80 through the central transverse locking screw bore inlet 84.

Each one of the transverse locking screw bores 80 has a pair of peripheral transverse locking screw bore passages 88 wherein each one of the peripheral transverse locking screw bore passages 88 is adjacent to, but spaced radially inward of, each transverse locking screw bore outlet 82 of each transverse locking screw bore 80. Each peripheral transverse locking screw bore passage 88 directly communicates with the coolant volume 140.

The shank portion 77 of the locking screw 70 contains a central longitudinal locking screw bore 100, which has a central longitudinal locking screw bore inlet 102 and a central longitudinal locking screw bore outlet 106. When in an assembled condition, the central longitudinal locking screw bore 100 is generally co-axial with the central longitudinal axis A-A of the cutting tool 20. The exterior surface 94 of the shank portion 77 defines a threaded region 110, which has exterior threads. As one can appreciate, upon assembly of the locking screw 70 to the adapter 40, the exterior threads in the threaded region 110 engage interior threads in the interior threaded region 56 of the central axial adapter bore 50 near the pilot 48. The locking screw 70 is tightened down to secure the cutter body 22 to the adapter 40.

In reference to the assembly of the components, the cutter body 22 is positioned adjacent to the axial forward end 42 of the adapter 40. The pilot 48 of the adapter 40 passes through the pilot hole 30 in the cutter body 22. When in this condition, the cutter body 22 seats on the adapter 40. The locking screw 70 passes through the central aperture 28 of the cutter body 22 whereby the threads in the threaded region 110 threadedly engage the interior threads in the threaded region 56 of the central axial adapter bore 50. The locking screw 70 is threaded tight to securely retain the cutter head 22 to the adapter 40. As described above, there is a coolant volume 140 defined in a vicinity of the meeting of the cutter body 22, the adapter 40, and the locking screw 70.

Figure 6:
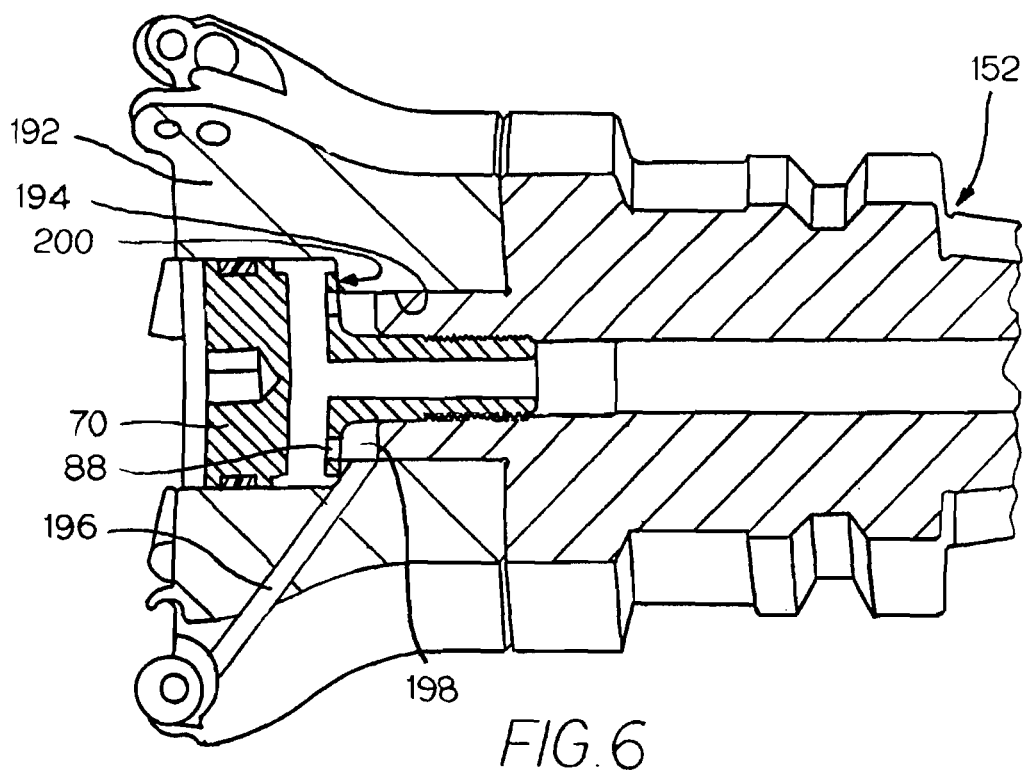
FIG. 6 is a side view of the axial forward end portion of another assembly that comprises a conventional adapter, a conventional cutter body and the specific embodiment of the locking screw of FIG. 3 with a portion removed to show the interior structure of the assembly wherein the entrance to the coolant passage in the cutter body is below (axially rearward of) the location where the locking screw seats on the cutter body.

The locking screw 70 seats against the cutter body 22 at the location generally designated as 200. In the specific embodiment of FIG. 1, the entrance 33 to the coolant passage 32 in the cutter body 22 directly communicates with the transverse locking screw bore 80. The location of the entrance 33 to the coolant passage 32 is above (or axially forward of) the location 200 where the locking screw 70 seats against the cutter body 22. There should be an appreciation that because coolant is in the coolant volume 140, there is the design option that the coolant passage 32 could have directly communicated with the coolant volume 140. In such a situation, the location of the entrance 33 to the coolant passage 32 would be below (or axially rearward of) the location 200 where the locking screw 70 seats against the cutter body 22. The embodiment of FIG. 6 shows such a specific embodiment. By providing a locking screw 70 that provides fluid communication between the coolant volume 140 and the transverse locking screw bore 88, there is an increase in the design flexibility for the cutter body 22.

Referring to the drawings, in operation, from a coolant source 130 coolant enters into the central axial adapter bore 50 through the central axial adapter bore inlet 52. The coolant typically is under pressure from the coolant source 130. Coolant then passes through the central axial adapter bore inlet 52 and into the central axial adapter bore 50. Coolant exits the central axial adapter bore 50 either directly into the locking screw 70 or into the peripheral adapter bores 60. In reference to the flow of coolant, in one range, between about 60 volume percent and between about 80 volume percent of the coolant entering the central axial adapter bore inlet 52 flows through the entire length of the central axial adapter bore 50, and between about 20 volume percent and about 40 volume percent of the coolant entering the central axial adapter bore inlet 52 flows through the peripheral adapter bores 60. In another range, between about 65 volume percent and between about 75 volume percent of the coolant entering the central axial adapter bore inlet 52 flows through the entire length of the central axial adapter bore 50, and between about 25 volume percent and about 35 volume percent of the coolant entering the central axial adapter bore inlet 52 flows through the peripheral adapter bores 60.

As is shown in FIG. 4A, the intersecting transverse locking screw bores 80 intersect at a location generally at the central longitudinal axis B-B of the adapter 40. Coolant exiting through the central axial adapter bore outlet 54 flows directly into the pair of intersecting transverse locking screw bores 80 in the locking screw 70 at this point of intersection. There should be an appreciation that there is no intention to restrict the scope of the invention by the number of transverse locking screw bores. Different applications and circumstances may necessitate a different number of the transverse locking screw bores. Coolant exiting the central axial adapter bore 50 through the peripheral adapter bore inlets 62 travels through the peripheral adapter bores 60 exiting into the corresponding one of the intersecting transverse locking screw bores 80 at the corresponding one of the peripheral transverse locking screw bore passages 88.

Whether the coolant enters into the intersecting transverse locking screw bores 80 through the central transverse locking screw bore inlet 84 or the peripheral transverse locking screw bore passages 88, coolant travels through the transverse locking screw bores 80 so as to exit via the transverse locking screw bore outlets 82 into the cutter body coolant passage(s) 32. Coolant the travels through each cutter body coolant passage 32 discharging from the discharge opening 36 of the cutter body coolant passage 32 in a direction to impinge the cutting insert and/or in the vicinity of the interface between the cutting insert and the workpiece material.

Figure 5:
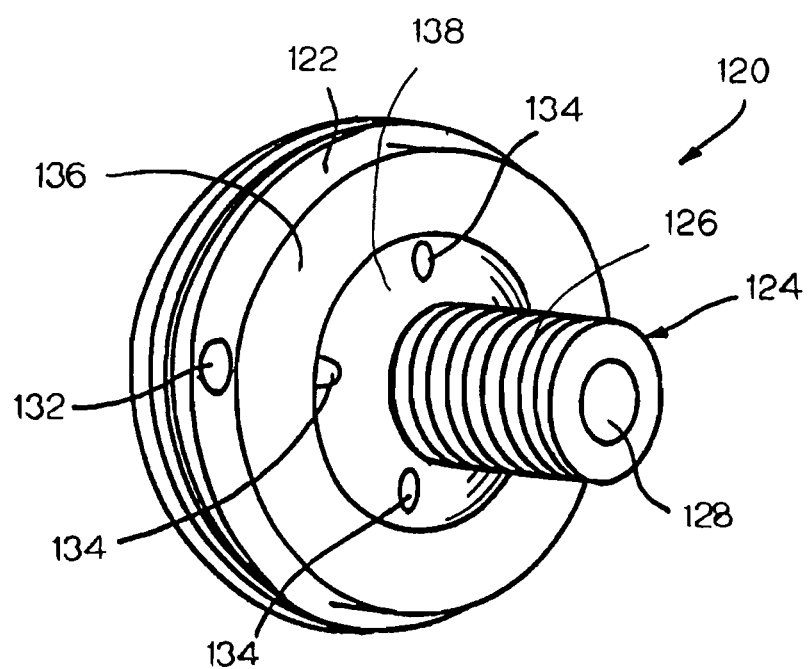
FIG. 5 is an isometric view of a second specific embodiment of a locking screw suitable for use with the cutter body and adapter in the assembly of FIG. 1.

Referring to FIG. 5, there is illustrated another specific embodiment of the locking screw generally designated as 120. Locking screw 120 has a head portion 122 and a shank portion 124, which has external threaded 126. Locking screw 120 has a central longitudinal locking screw bore 128, as well as transverse locking screw bores 132 and peripheral transverse locking screw bore passages 134. The axial rearward facing surface 136 of the locking screw 120 contains a bowl-shaped portion 138 adjacent the shank portion 124. When the locking screw 120 is used to attach the cutter body 22 to the adapter 40, it is apparent that the bowl-shaped portion 138 enlarges the size of the coolant volume defined in a vicinity of a meeting of the cutter body 22, the adapter 40 and the locking screw 120. This specific embodiment of the locking screw 120 thus provides an increase in the volume of the coolant supply available for coolant delivery to the cutting insert and/or vicinity of the cutting insert-workpiece interface.

FIG. 6 is a side view of the axial forward end portion of an assembly that comprises a conventional adapter 152, a cutter body 192, and the specific embodiment of the locking screw 70 of FIG. 3. The cutter body 192 has a pilot hole 194 and a coolant passage 196. There is a coolant volume 198, which is defined in a vicinity of a meeting of the cutter body, the adapter and the locking screw. As can be appreciated, the coolant passage 196 directly communicates with the coolant volume 198. The entrance to the coolant passage 196 is below (or axially rearward of) the location 200 where the locking screw 70 seats against the cutter body 192. The presence of coolant in the coolant volume 198 provides for design flexibility as discussed above for the cutter body. More specifically, the coolant passage can have an orientation wherein it directly communicates either with the transverse locking screw bore or the coolant volume.

Figure 7:
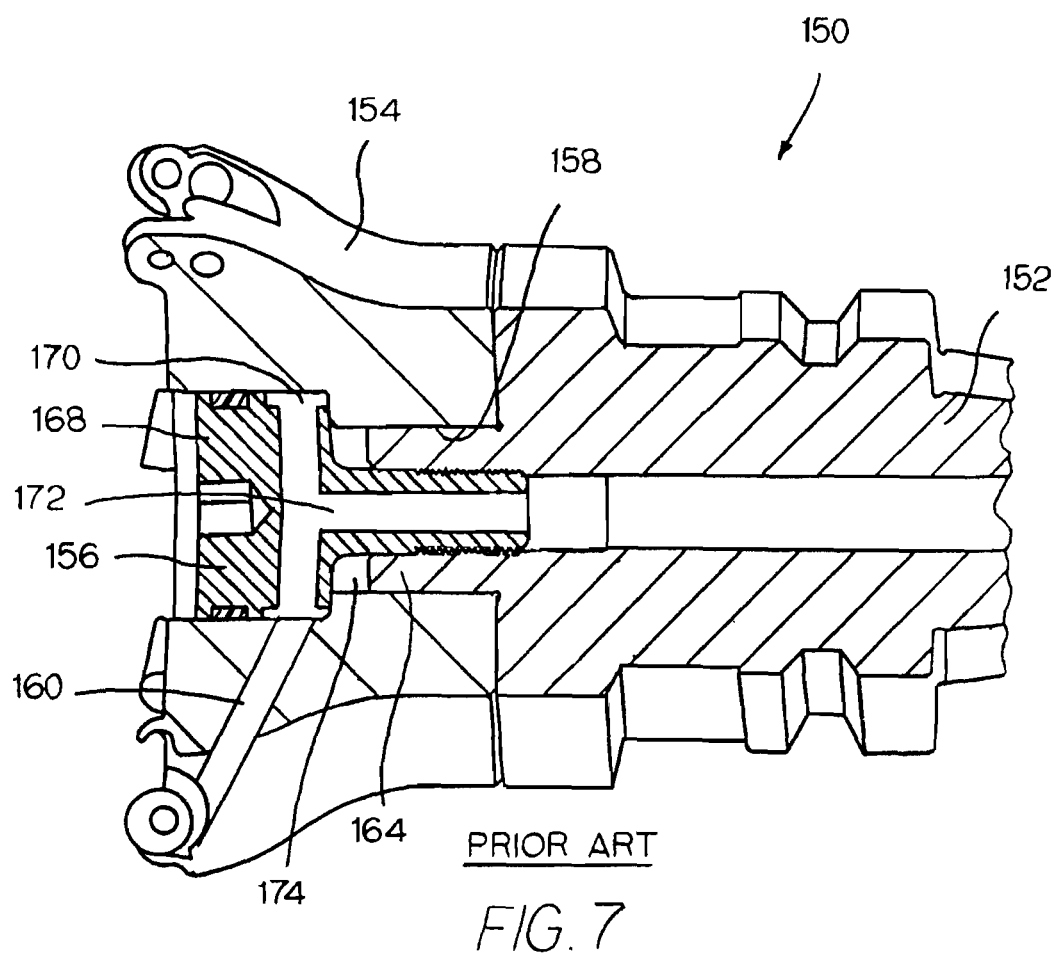
FIG. 7 is a side view of the axial forward end portion of a prior art assembly that comprises a conventional adapter, a conventional cutter body and a conventional locking screw with a portion removed to show the interior structure of the assembly.

FIG. 7 is a side view of the axial forward end portion of a prior art cutting tool assembly 150 that comprises a conventional adapter 152, a conventional cutter body 154, and a conventional locking screw 156. The conventional cutter body 154 has a pilot hole 158 and a coolant passage 160. The conventional adapter 152 has a pilot 164 and a central axial adapter bore 166. The conventional locking screw 156 has a head portion 168, which contains a transverse locking screw bore 170. The conventional locking screw 156 further contains a central axial locking screw bore 172, which communicates with the transverse locking screw bore 170. As shown in FIG. 7, the locking screw 156 secures the cutter body 154 to the adapter 152 wherein the pilot hole 158 receives the pilot 164. Further, there is a volume 174 in the vicinity of the meeting of the cutter body 154, the adapter 152 and the locking screw 156. The volume 174 is isolated in that coolant does not flow into the volume 174. There should be an appreciation that the prior art cutting tool has no design flexibility for the cutter body when it comes to the location of the entrance to the coolant passage. The coolant passage must directly communicate with the transverse locking screw bore at a location above (or axially forward of) the location where the locking screw seats against the cutter body.

It is apparent that the present invention provides a locking screw, which is a component of the entire assembly, to facilitate an increase in the volume of coolant available for delivery to the cutting insert and/or the vicinity of the cutting insert-workpiece interface over what has been available heretofore. It is also apparent that the present invention provides a locking screw in combination with other components(s) that facilitates an increase in the volume of coolant available for delivery to the cutting insert and/or the vicinity of the cutting insert-workpiece interface over what has been available heretofore.

Further, it is apparent that the present invention provides a locking screw of such a design to provide design flexibility of the cutter body. Per the present invention, the entrance to the coolant passage in the cutter body can either be above (axially forward of) or below (axially rearward of) the location where the locking screw 70 seats against the cutter body. This feature provides design flexibility for the cutter body not heretofore available.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting tool in fluid communication with a coolant source, the cutting tool comprising:

a cutter body adapted to carry a cutting insert, the cutter body containing a cutter body coolant passage;

an adapter containing a first adapter bore in fluid communication with the coolant source;

a locking screw, the locking screw engaging the adapter so as to secure the cutter body to the adapter;

a coolant volume being defined in a vicinity of a meeting of the cutter body, the adapter and the locking screw;

the locking screw containing a locking screw bore in fluid communication with the first adapter bore, the locking screw further containing a peripheral locking screw bore passage in fluid communication with the coolant volume and the locking screw bore;

the locking screw bore being in fluid communication with the cutter body coolant passage; and the coolant volume being in fluid communication with the cutter body coolant passage.

2. The cutting tool according to claim 1 wherein the locking screw bore being in direct fluid communication with the cutter body coolant passage.

3. The cutting tool according to claim 1 wherein the coolant volume being in direct fluid communication with the cutter body coolant passage.

4. The cutting tool according to claim 1 wherein the adapter further containing a second adapter bore, the second adapter bore being a fluid communication with the first adapter bore, and the second adapter bore being in direct fluid communication with the coolant volume.

5. The cutting tool according to claim 4 wherein the first adapter bore having a first adapter bore inlet, between about 60 volume percent and between about 80 volume percent of the coolant entering the first adapter bore inlet flows through the entire length of the first adapter bore, and between about 20 volume percent and about 40 volume percent of the coolant entering the first adapter bore inlet flows into the second adapter bore.

6. The cutting tool according to claim 5 wherein between about 65 volume percent and between about 75 volume percent of the coolant entering the first adapter bore inlet flows through the entire length of the first adapter bore, and between about 25 volume percent and about 35 volume percent of the coolant entering the first adapter bore inlet flows into the second adapter bore.

7. The cutting tool according to claim 4 wherein the adapter having a central longitudinal adapter axis, the first adapter bore being an axial adapter bore in general axial alignment with the central longitudinal adapter axis; and the second adapter bore being a peripheral adapter bore offset radially from the central longitudinal adapter axis.

8. The cutting tool according to claim 1 wherein the locking screw carrying a locking screw seal, the locking screw seal creating a fluid-tight seal between the locking screw and the cutter body.

9. The cutting tool according to claim 1 wherein the cutter body containing a pilot hole, the adapter having a pilot, and the pilot being received by the pilot hole upon assembly of the cutter body and the adapter.

10. An adapter for attachment to a cutter body by a locking screw, and the adapter being in fluid communication with a coolant source, the adapter comprising:
   an adapter body having a central longitudinal adapter axis, the adapter body containing an axial adapter bore generally co-axial with the central longitudinal adapter axis, and the axial adapter bore being in fluid communication with the coolant source;
   the adapter containing a peripheral adapter bore offset radially from the central longitudinal adapter axis; and
   the axial adapter bore being in fluid communication with the peripheral adapter bore.

11. The adapter according to claim 10 wherein the adapter body containing a plurality of the peripheral adapter bores.

12. The adapter according to claim 10 wherein the axial adapter bore having an axial adapter bore inlet, between about 60 volume percent and between about 80 volume percent of the coolant entering the axial adapter bore inlet flows through an entire length of the axial adapter bore, and between about 20 volume percent and about 40 volume percent of the coolant entering the axial adapter bore inlet flows into the peripheral adapter bore.

13. The adapter according to claim 10 wherein the axial adapter bore having an axial adapter bore inlet, between about 65 volume percent and between about 75 volume percent of the coolant entering the axial adapter bore inlet flows through an entire length of the axial adapter bore, and between about 25 volume percent and about 35 volume percent of the coolant entering the axial adapter bore inlet flows into the peripheral adapter bore.

14. The adapter according to claim 10 including a coolant volume defined in a vicinity of a meeting of the cutter body, the adapter and the locking screw; and the peripheral adapter bore being in fluid communication with the coolant volume.

15. A locking screw for use in the attachment of a cutter body to an adapter wherein the adapter is in fluid communication with a coolant source via an axial adapter bore and a coolant volume being defined in a vicinity of a meeting of the cutter body, the adapter and the locking screw, the locking screw comprising:
   a locking screw body containing a transverse locking screw bore, and the transverse locking screw bore being in fluid communication with the axial adapter bore; and
   the transverse locking screw bore having a peripheral transverse locking screw bore passage wherein the peripheral transverse locking screw bore passage is in fluid communication with the coolant volume.

16. The locking screw according to claim 15 wherein the locking screw containing a plurality of the transverse locking screw bores and a plurality of the peripheral transverse locking screw bore passages, and at least one of the peripheral transverse locking screw bore passages being in fluid communication with each one of the peripheral transverse locking screw bore passages.

17. The locking screw according to claim 15 wherein the locking screw body having a head portion with an axially rearward facing surface, and the locking screw further including a shank portion extending in an axial rearward direction from the axially rearward facing surface, the axially rearward facing surface containing a bowl-shaped portion adjacent the shank portion, and the peripheral transverse locking screw bore passage opening in the bowl-shaped portion.

18. The locking screw according to claim 17 wherein when the cutter body being assembled to the adapter, the bowl-shaped portion of the locking screw being adjacent to the coolant volume.

* * * * *